United States Patent [19]

Adlerstein et al.

[11] 4,413,280
[45] Nov. 1, 1983

[54] X-RAY IMAGING APPARATUS

[75] Inventors: Joseph K. Adlerstein, Kew Gardens; Heinz F. Nitka, Binghamton, both of N.Y.; Charles S. Naiman, Brookline; Aryeh Weiss, Cambridge, both of Mass.

[73] Assignee: Xyram Corporation, Tuckahoe, N.Y.

[21] Appl. No.: 249,909

[22] Filed: Apr. 1, 1981

[51] Int. Cl.³ ............................................. H04M 5/32
[52] U.S. Cl. .................................. 358/111; 358/213; 357/24; 378/99
[58] Field of Search ............................... 358/111, 213; 250/416 TV, 213 VT; 357/24 LR, 29; 378/99

[56] References Cited

U.S. PATENT DOCUMENTS 4,119,841 10/1978 Jantsch .................... 250/213 VT
4,140,909 2/1979 Brown et al. ........................ 357/24
4,268,750 5/1981 Cowart ............................... 358/111

Primary Examiner—Robert L. Griffin
Assistant Examiner—Edward L. Coles
Attorney, Agent, or Firm—Hopgood, Calimafde, Kalil, Blaustein & Judlowe

[57] ABSTRACT

An X-ray imaging apparatus includes a transducer for converting incident X-radiation to a corresponding pattern of electrical charges. The charges generated by the transducer are accelerated onto an array of charge-detecting or charge-storing devices which store the charges in the form of an electrical signal corresponding to the charge pattern. The electrical signal may be transferred out of the array of charge-storing devices to an external signal-processing apparatus, such as one employing digital processing techniques, at which the signal may be stored or displayed as an X-ray image.

16 Claims, 3 Drawing Figures

X-RAY IMAGING APPARATUS

The present invention relates generally to radiography, and, more particularly, to an improved X-ray imaging apparatus.

The widespread use of X-ray film to record an X-ray image requires the performance of several wet, control-requiring chemical developing steps. In addition, the increased cost of the silver halide film used in this process has added to the expense of preparing X-ray images in this manner. There is also an increasing concern over the relatively high doses of radiation to which the patient must be exposed in many of the conventional X-radiation procedures. The known X-ray techniques, such as image intensifiers and photo-fluoroscopy, may also produce images of low resolution, which reduces the effectiveness of the image as a diagnostic tool. Another drawback associated with the use of conventional X-ray apparatus and techniques is that the images produced are difficult to use at locations remote from the hospital or radiologist's office.

In recent years there has been a marked improvement in, and a reduction in the costs of, electronic and particularly digital signal-processing techniques. However, despite the many advantages that the use of digital processing techniques could provide to X-radiography, no X-ray apparatus capable of producing high-quality X-ray images with sufficient resolution and at a sufficiently rapid scanning rate has been commercially developed that is readily amenable to the use of electronic, and particularly digital, techniques for processing, storing, and displaying X-ray images.

A recognition of the desirability of the use of electronic processing techniques for producing X-ray images is found in U.S. Pat. No. 4,119,841 to Jantsch et al, which discloses an X-ray scanner in which the X-ray images are converted to electrical signals, which can be evaluated in an electronic storage system. This system is, however, relatively complex and costly, and the need still exists for a relatively low-cost X-ray scanning and imaging apparatus that provides high-resolution images at low dosages of radiation, and in which the X-rays that pass through the body are converted to electrical signals that can be readily digitized, stored, and displayed.

It is accordingly an object of the invention to provide an X-ray imaging apparatus which provides high-resolution X-ray images even with the use of low radiation dosages.

It is another object of the invention to provide an X-ray imaging apparatus in which the image information can be readily processed, stored, and displayed through the use of digital techniques.

It is a further object of the invention to provide an X-ray imaging apparatus, which provides a high-resolution X-ray image taken along a scanned portion of a patient's body, without the need for moving mechanical components.

It is yet another object of the present invention to provide an X-ray imaging apparatus of the type described which is relatively inexpensive to purchase and which can be operated at a relatively low cost.

It is still a further object of the invention to provide an X-ray imaging apparatus, which is inherently self-scanning and in which access to the X-ray image is available immediately after the X-ray scan is completed.

In the X-ray imaging apparatus of the invention, X-rays that pass through a body under investigation are converted in a transducer to a corresponding pattern of electrical charges. The charges are accelerated onto, and detected and stored in, a self-scanning array of charge-storing devices, such as an array of charge-coupled devices (CCDs) or charge-injection devices (CIDs). The stored signals are transferred out of the array to suitable signal processing circuitry. For example, the stored signals may be converted to a corresponding digital signal which, in turn, can either be stored or otherwise utilized, through the use of digital techniques, to produce an X-ray image of high resolution To the accomplishment of the above and to such further objects as may hereinafter appear, the present invention relates to an X-ray imaging apparatus, substantially as defined in the appended claims, and as described in the following specification as considered together with the accompanying drawing, in which:

Figure 1:
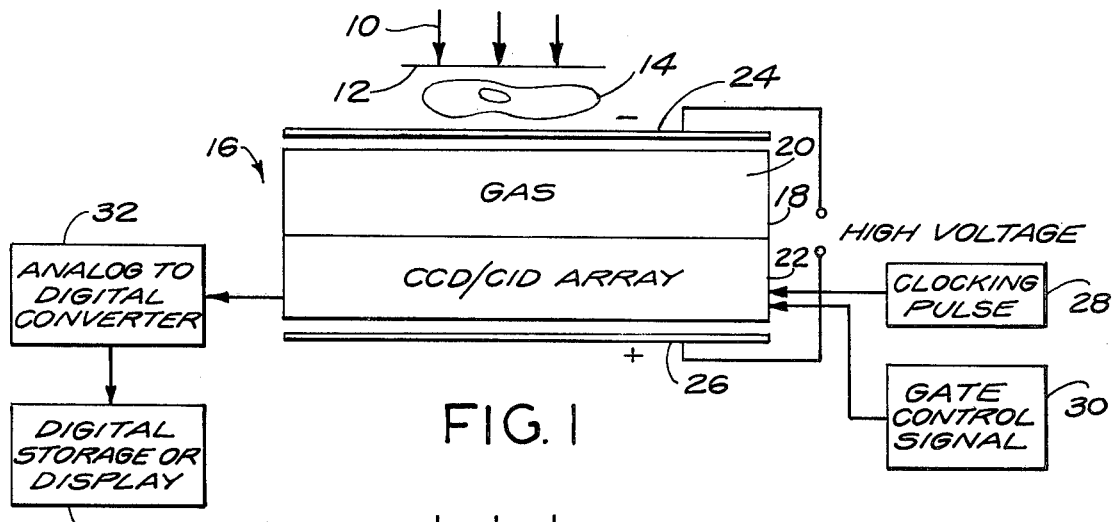
FIG. 1 is a schematic diagram of an X-ray imaging apparatus in accordance with an embodiment of the invention.

As illustrated in FIG. 1, a source of X-rays 10 is directed through a narrow slit or shutter 12 interposed between the source 10 and a body 14 under investigation to produce a narrow collimated beam of X-rays which pass through the body. The X-rays pass through body 14 in an inverse proportion to the absorption of the X-rays by different parts of the body, and thereafter impinge on the X-ray imaging apparatus of the invention, which is generally designated in FIG. 1 by the reference numeral 16. Apparatus 16 includes a housing 18 which contains an ionizable absorber that receives the X-rays passing through the body 14, and which produces a corresponding pattern of photo-electrons or electrical charges. Also included in housing 18 is a self-scanned array of charge-storing devices which detect and store the photo-electrons produced in the ionizable absorber as a corresponding electrical signal.

In the embodiment of the invention illustrated in FIG. 1, the X-ray-to-charge transducer or ionizable absorber is in the form of a gas maintained at a high pressure in a chamber 20 formed in housing 18. This gas has the characteristic of absorbing the incident X-radiation and converting that radiation into electrical charges or photo-electrons corresponding to the incident X-rays. The gas in chamber 20 is preferably maintained at a pressure in the order of ten atmospheres and is advantageously of a high atomic number, such as xenon or bromated freon. The gap width of the ionizable gas in chamber 20 is preferably in the order of one centimeter.

In contact with the ionizable gas in chamber 20 is a linear self-scanning array 22 of charge-storing devices, here shown in the form of an array of charge-coupled devices (CCDs) or charge-injection devices (CCDs), which are arranged in a manner described in greater detail below with reference to FIG. 3. CCDs and CIDs are devices fabricated by the use of MOS technology in which charge carriers are stored under the electrodes at the upper surface of the semiconductor body. An electrical signal may be generated from an array of these devices by transferring (sequentially for CCDs, randomly for CIDs) the stored charge between adjacent electrodes to the last or read-out devices in the array.

In the operation of the imaging apparatus of FIG. 1, when the X-rays that have passed through body 14 impinge upon the molecules of the gas in chamber 20, the gas molecules are ionized. The pattern of the electrical charges produced in this manner is, as previously noted, thus proportional to the intensity of the incident X-rays. The electrons generated in the ionization process are accelerated by an accelerating potential of between 5 Kv and 30 Kv applied across a pair of electrodes 24,26, and are caused to impinge on the CCD array 22, such that the CCDs in the array detect and store the charges produced by the ionizable gas medium in chamber 20.

In order to generate an electrical signal that is representative of the charges stored in the CCD array, the stored charges are sequentially transferred through the array to an output utilization device. To this end, a series of clocking pulses are applied to the array of storing devices from a clocking pulse generator 28, and the array also receives a gate control signal from a gate control signal generator 30.

In a known manner, the clock and gate control signals serially and sequentially transfer the charges stored in the CCD array along each device in the array and to an output device at which the electrical signals derived from the CCDs can be further processed for display or storage. As shown in the embodiment of FIG. 1, the electrical signal derived from the CCD array, which represents in analog form, the X-ray image produced by the X-rays striking the gas medium, can be applied to an analog-to-digital converter 32, which, in a known manner, converts the analog signal derived from the CCD array to a corresponding digital signal. The digital signal may, in turn, be applied to a storage device, such as a disc e.g., of magnetic or laser construction, drum, or other memory device, and to a digital display, as shown at 34, which could produce a visual display of the X-ray image of body 14. If desired, the analog output of the CCD array could also be applied to a video processing unit to produce a video display of the X-ray image.

Figure 3:
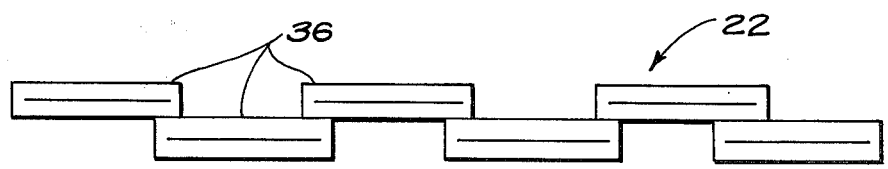
FIG. 3 is a plan view of a linear array of CCDs, which can be used to advantage in the X-ray imaging apparatus of the invention.

Since CCDs and CIDs are typically in the order of 2 inches in length and are not at the present time available in dimensions sufficiently large to receive and store a charge image produced by a linear scan taken across the width of a patient's body, the individual CCDs or CIDs in the array 22 may be arranged, as shown in FIG. 3, in two staggered or offset rows, such that the charges produced in chamber 20 by the scanning X-ray beam striking the gas medium can be sequentially detected by the CCDs in array 22 as the X-ray beam scans across the body. In this manner, the system can be considered as being self-scanning in that the X-ray charges produced in the gas medium as the beam scans are sequentially stored in the CCD array in synchronism with the beam scan.

By accelerating the electrical charges produced by the gas in chamber 20 directly onto the charge-storing devices in array 22, a gain of over 1,000 can be expected as a result of secondary electron generation. Thus, the devices in array 22 can store significant charge levels even for low levels or charges produced in the ionizable gas in response to the incident X-radiation.

Figure 2:
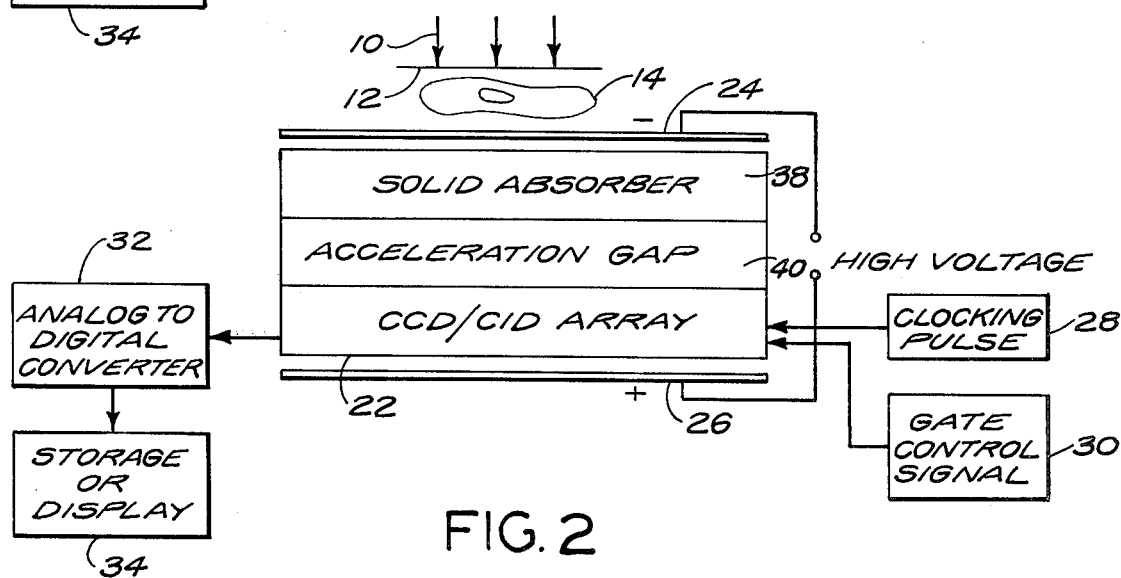
FIG. 2 is a schematic diagram of an X-ray imaging apparatus in accordance with an alternative embodiment of the invention.

In an alternative embodiment of the invention illustrated in FIG. 2, the ionic absorber or X-ray-to-charge transducer is in the form of a solid crystal 36 preferably about 1 mm. in thickness, and which preferably consists of high-purity gadolinium gallium garnet (GGG), yttrium aluminum garnet (YAG), or yttrium lithium fluoride (YLF). Other examples of ionic absorbers that may be employed to advantage in this embodiment incude semiconductor materials such as cadmium sulfide and selenium. The crystal 36 is spaced from the CCD array 22 by a vacuum acceleration gap 38 of approximately 1 cm. in width, and, as in the embodiment of FIG. 1, a high voltage in the order of 5 Kv to 30 Kv is applied across the electrodes 24 and 26.

The operation of the embodiment of FIG. 2 is similar to that of the first-described embodiment in that the X-rays impinging on the solid crystal absorber 36 cause the crystal material to produce electron charges, which are accelerated by the high voltage across the vacuum gap 38 onto the active surfaces of the CCD array 22. The level of the accelerating voltage applied across the electrodes 24,26, and the width of the gap 38 are chosen such that the electron charges produced by the ionizable crystal strike the surfaces of the CCDs with sufficient energy to enable the CCDs to store the corresponding charges at the surfaces of the CCDs. Those stored charges are then, as described previously, sequentially transferred along the CCD array and fed out to an external electronic processing system, which may advantageously be a digital system, which can readily process, store and display an X-ray image by the use of conventional digital techniques.

It will thus be appreciated from the foregoing description of embodiments of the invention that the X-ray imaging apparatus of the invention is capable of producing high-resolution images at low doses of radiation, and is readily adaptable for use with external digital processing circuitry to process, store, and display the X-ray images.

It will also be understood that although the apparatus of the invention has been described with reference to two embodiments thereof, modifications may become apparent to those skilled in the art without necessarily departing from the spirit and scope of the invention.

What is claimed is:

1. An X-ray imaging apparatus for use with a source of X-radiation, said apparatus comprising an array of charge-storing means, a medium interposed between a body under observation and said charge-storing means for converting X-radiation passing through the body and through said medium to a corresponding pattern of electrical charges, said array of charge-storing means being located proximate to said medium for storing said pattern of electrical charges, means for accelerating said electrical charges from said medium onto said charge-storing means, means coupled to said charge-storing means for developing an output electrical signal corresponding to said stored electrical charges, and means coupled to said signal-developing means for applying said output signal to an output utilization device.

2. The apparatus of claim 1, in which said medium comprises a gas maintained at a pressure exceeding one atmosphere.

3. The apparatus of claim 2, in which said gas is one having a high atomic number selected from the group consisting of xenon and bromated freon.

4. The apparatus of claim 1, in which said medium is an ionizable crystal material, and further comprising a vacuum gap interposed intermediate said crystal material and said charge-storing devices.

5. The apparatus of claim 4, in which said crystal material is selected from the group consisting of gadolinium garnet, yttrium aluminum garnet, and yttrium lithium fluoride.

6. The apparatus of claim 1, in which said charge-storing means comprises a plurality of semiconductor devices selected from the group consisting of CCDs and CIDs.

7. The apparatus of claim 2, in which said charge-storing means comprises a plurality of semiconductor devices selected from the group consisting of CCDs and CIDs.

8. The apparatus of claim 3, in which said charge-storing means comprises a plurality of semiconductor devices selected from the group consisting of CCDs and CIDs.

9. The apparatus of claim 4, in which said charge-storing means comprises a plurality of semiconductor devices selected from the group consisting of CCDs and CIDs.

10. The apparatus of claim 5, in which said charge-storing means comprises a plurality of semiconductor devices selected from the group consisting of CCDs and CIDs.

11. The apparatus of claim 4, in which said accelerating means includes a voltage source producing a voltage across said gap, the value of said accelerating voltage and the width of said gap being selected so that said charges are caused to strike the surfaces of said charge-storing devices with sufficient energy to cause said charges to be stored at the surfaces of said charge-storing devices.

12. The apparatus of claim 6, in which said charge-storing devices are arranged in an array lying along the axis of scan of the X-ray source.

13. The apparatus of claim 6, further comprising means coupled to said charge-storing devices for converting the charges stored by said charge-storing means to a corresponding electrical digital signal, said utilization device being coupled to means for storing or displaying said digital signal.

14. The apparatus of claim 12, further comprising means coupled to said charge-storing devices for converting the charges stored by said charge-storing means to a corresponding electrical digital signal, said utilization device being coupled to means for storing or displaying said digital signal.

15. The apparatus of claim 1, in which said medium is a semiconductor material.

16. The apparatus of claim 15, in which said semiconductor material is selected from the group consisting of cadmium sulfide and selenium.

* * * * *